July 16, 1929.  M. H. GATELY  1,720,952

CENTRIFUGALLY OPERATED CLUTCH

Filed Dec. 3, 1927

Martin H. Gately
INVENTOR

BY Victor J. Evans
ATTORNEY

WITNESS:

Patented July 16, 1929.

1,720,952

UNITED STATES PATENT OFFICE.

MARTIN HENRY GATELY, OF HENDERSON, NEBRASKA.

CENTRIFUGALLY-OPERATED CLUTCH.

Application filed December 3, 1927. Serial No. 237,531.

The object of this invention is to provide a centrifugally operated clutch especially adapted for use on feed and forage grinding machines, but also adapted for apparatus of other types wherein a controlling device including pivoted and weighted arms for connecting with a pulley and fly wheel may be employed to advantage, and wherein locking and releasing means are provided between the wheel and a shaft on which the wheel is loosely mounted.

A further object is to provide a centrifugally operated clutch comprising arms moved by centrifugal action and cooperating with each other and with a dog mounted on an element adapted to be made rigid with reference to a shaft on which the pulley and fly wheel is loosely mounted, said fly wheel however rotating with the shaft when the wheel has attained a predetermined momentum, or minimum speed, and when the pivoted arms, thrown outwardly, engage each other and engage a locking dog for effecting connection between the wheel and shaft to be driven.

A further object is to provide a device which will automatically release the connection between the pulley and fly wheel and its shaft in the event of the machine being retarded or stopped by accident.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1:
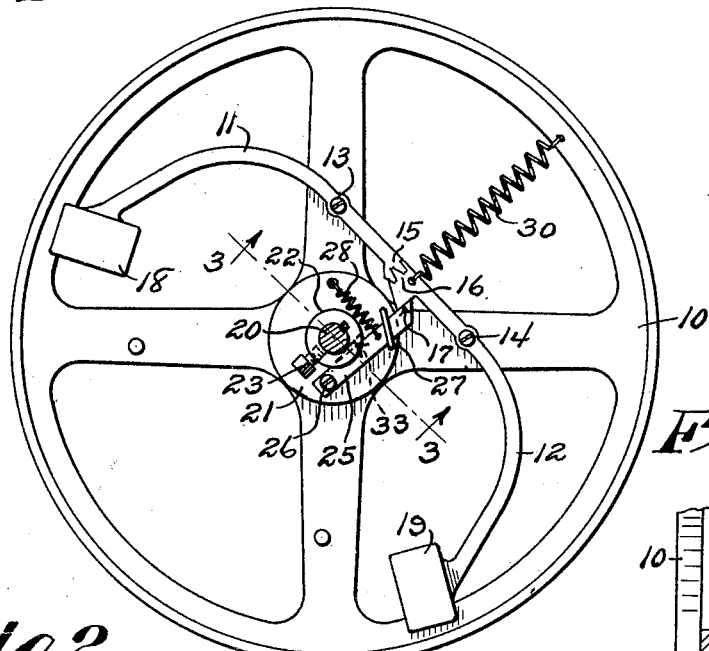
Figure 1 is a view of the centrifugally operated clutch in elevation.
Figure 3:
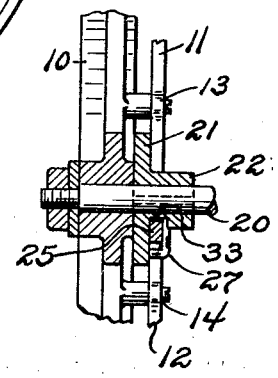
Figure 3 is a section on line 3—3 of Figure 1.

The fly wheel is designated 10, and as used in my co-pending application, Serial No. 237,530, this element constitutes a driving pulley wheel. Arms 11 and 12 are pivoted respectively at 13 and 14 on wheel 10, and arm 11 includes end teeth 15 for cooperation with end teeth 16 on arm 12. The arm last named further includes a shoulder 17, and the arms each include a ball or weight, as shown at 18 and 19.

The shaft 20 has rigidly mounted thereon a plate 21 including a collar or hub portion 22, and this device is secured to the shaft by means of a set screw 23. A dog 25 is pivotally mounted at 26 on the plate 21, and one end portion passes thru staple or loop member 27, permitting limited movement under the influence of a spring 28. The end of the dog 25 is bevelled, and is provided with a straight edge portion adapted to cooperate with the shoulder 17 on arm 12. This arm last named is connected by a retractile spring 30 with the rim portion of the wheel 10.

A flat surface 33 on the collar 22 is adapted for engagement by the dog 25.

Assuming the wheel 10 is driven by a belt from another element of the machine carrying the centrifugally operated clutch, this wheel 10 will rotate freely until it has attained the sufficient speed to cause arms 11 and 12 to move outwardly under centrifugal action. This produces engagement between teeth 15 and 16, and engagement between the dog 25 and shoulder 17, so that the locking position of Figure 1 is assumed, and shaft 20 will then rotate with the fly wheel, and will pick up the feeder of my co-pending application, Serial No. 237,530, at the same speed, at all times, regardless of the extent of the load, this pick up being however at low speed.

Figure 2:
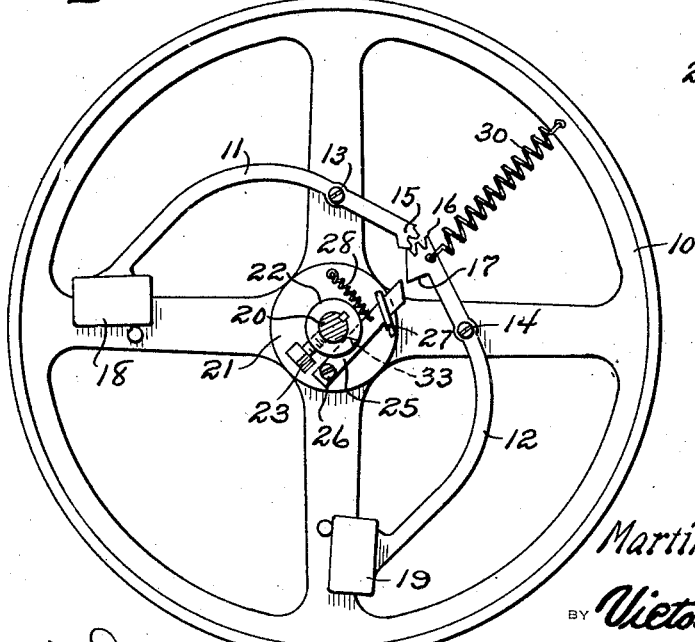
Figure 2 is also a view in elevation, the pivoted arms being released from the dog, so that the wheel may run loose with reference to the shaft.

Dog 25 is mounted as shown and extends parallel with the diameter of the plate 21 which is rigid with the shaft 20, and is limited in its movement under the action of spring 28, and this particular mounting permits outward movement of the dog, from the axis of the shaft, and also permits the positive locking of the elements, so that there will be no slipping, and wear at the points of engagement will be reduced to a minimum. The dog yields under the action of spring 28 when the centrifugally operated clutch is in the position of Figure 2.

What is claimed is:—

1. The combination with a loosely mounted fly wheel, of a plurality of weighted arms pivoted on the wheel and having their inner ends in proximity, these ends carrying engaging devices and one of the ends including a shoulder, a shaft on which the wheel is rotatable, an element rigid with the shaft and adjacent to the fly wheel, and a dog pivoted on said element and movable outwardly from the axis of the shaft, said dog being engaged by the shoulder, when the outer ends of the arms move outwardly under centrifugal action.

2. The combination with a loosely mounted fly wheel, of a plurality of weighted arms pivoted on the wheel and having their inner ends in proximity, these ends carrying engaging devices and one of the ends including a shoulder, a shaft on which the wheel is rotatable, a resilient device connected with the inner end of one of the arms, an element rigid with the shaft, and adjacent to the wheel, a dog pivoted on said element and movable outwardly from the axis of the shaft, means limiting the movement of the dog, and a spring permitting this limited movement, the outer end portion of the dog being engaged by the shoulder on one of the arms when said arms are thrown outwardly under centrifugal action, and their inner ends move inwardly.

In testimony whereof I affix my signature.

MARTIN HENRY GATELY.